(12) United States Patent
Yoshizawa

(10) Patent No.: US 9,967,548 B2
(45) Date of Patent: May 8, 2018

(54) STEREOSCOPIC VIDEO IMAGING SYSTEM AND SYNCHRONOUS CONTROL METHOD

(75) Inventor: Yasuo Yoshizawa, Tokyo (JP)

(73) Assignee: Sony Corporation, Tokyo (JP)

( * ) Notice: Subject to any disclaimer, the term of this patent is extended or adjusted under 35 U.S.C. 154(b) by 353 days.

(21) Appl. No.: 14/119,102

(22) PCT Filed: May 21, 2012

(86) PCT No.: PCT/JP2012/003294
§ 371 (c)(1),
(2), (4) Date: Nov. 20, 2013

(87) PCT Pub. No.: WO2012/164858
PCT Pub. Date: Dec. 6, 2012

(65) Prior Publication Data
US 2014/0085419 A1    Mar. 27, 2014

(30) Foreign Application Priority Data

Jun. 3, 2011 (JP) ................................. 2011-125188

(51) Int. Cl.
*H04N 13/02* (2006.01)
*G03B 35/08* (2006.01)
*H04N 5/232* (2006.01)

(52) U.S. Cl.
CPC ......... *H04N 13/0296* (2013.01); *G03B 35/08* (2013.01); *H04N 13/0239* (2013.01); *G03B 2206/00* (2013.01); *H04N 5/23203* (2013.01)

(58) Field of Classification Search
CPC .......... H04N 13/0296; H04N 13/0239; H04N 5/23203; G03B 35/08; G03B 2206/00

(Continued)

(56) References Cited

U.S. PATENT DOCUMENTS 2,413,996 A * 1/1947 Ramsdell ............... G03B 35/10
                                                                      352/60
4,489,348 A * 12/1984 Lepley .................. H04N 5/0733
                                                                     348/506

(Continued)

FOREIGN PATENT DOCUMENTS

EP        0790734 A2 *  8/1997 ........... H04N 1/2112
GB        1534164 A  * 11/1978 ............. H03K 17/60

(Continued)

OTHER PUBLICATIONS

Office Action issued in corresponding Japanese Application No. 2011-125188 dated Mar. 29, 2016.

*Primary Examiner* — Jorge L Ortiz Criado
*Assistant Examiner* — Stefan Gadomski
(74) *Attorney, Agent, or Firm* — Haug Partners LLP; William S. Frommer

(57) ABSTRACT

A stereoscopic video imaging system includes a first imaging apparatus and a second imaging apparatus coupled to the first imaging apparatus and arranged to take a 3D image. A single cable connects the first imaging apparatus to the second imaging apparatus. A switching device selects one of the first and second imaging apparatuses to be a main imaging apparatus and the remaining imaging apparatus to be a sub imaging apparatus. The main imaging apparatus is enabled to generate a synchronization signal, the synchronization signal being communicated to the sub imaging apparatus through the single cable.

8 Claims, 10 Drawing Sheets

(58) Field of Classification Search
USPC .......................................................... 348/43
See application file for complete search history.

(56) References Cited

U.S. PATENT DOCUMENTS

| | | | | |
|---|---|---|---|---|
| 4,821,032 A | * | 4/1989 | Shimada | G11B 27/031 348/547 |
| 5,288,248 A | * | 2/1994 | Chen | H01R 23/6873 439/108 |
| 5,518,418 A | * | 5/1996 | Larabell | G11B 33/122 439/218 |
| 5,592,257 A | * | 1/1997 | Sakamoto | G03B 7/26 315/154 |
| 6,280,243 B1 | * | 8/2001 | Liu | H01R 13/64 439/502 |
| 6,388,571 B1 | * | 5/2002 | Kirino | G08B 13/19641 340/506 |
| 6,795,124 B1 | * | 9/2004 | Gamo | H04N 5/0733 348/521 |
| 2002/0093590 A1 | * | 7/2002 | Hodgkiss | H04N 5/073 348/500 |
| 2004/0202464 A1 | * | 10/2004 | Miyasaka | G03B 7/26 396/529 |
| 2006/0077888 A1 | * | 4/2006 | Karam | H04L 1/22 370/216 |
| 2007/0146478 A1 | * | 6/2007 | Butler-Smith | H04N 5/262 348/47 |
| 2007/0188603 A1 | * | 8/2007 | Riederer | G02B 21/22 348/54 |
| 2008/0303910 A1 | * | 12/2008 | Nishida | H04N 5/23203 348/211.11 |
| 2009/0204310 A1 | * | 8/2009 | Gittere | G07C 5/008 701/102 |
| 2010/0225744 A1 | * | 9/2010 | Tomizawa | G03B 17/18 348/47 |
| 2011/0122270 A1 | * | 5/2011 | Takagi | H04N 5/232 348/211.99 |
| 2011/0187833 A1 | * | 8/2011 | Hines | H04N 13/02 348/46 |
| 2011/0285826 A1 | * | 11/2011 | Bickerstaff | H04N 13/0246 348/47 |
| 2013/0021448 A1 | * | 1/2013 | Fairburn | H04N 13/02 348/47 |

FOREIGN PATENT DOCUMENTS

| | | | |
|---|---|---|---|
| JP | 5-227532 | | 9/1993 |
| JP | 8-172420 | | 7/1996 |
| JP | 2001-307556 | | 11/2001 |
| JP | 2002-214350 | | 7/2002 |
| JP | 2003-309759 | | 10/2003 |
| JP | 2004-040185 | | 2/2004 |
| JP | 2004-040370 | | 2/2004 |
| JP | 2005-39409 | | 2/2005 |
| JP | 2005-148090 | | 6/2005 |
| JP | 2006-311039 | | 11/2006 |
| JP | 2007-72210 | | 3/2007 |
| JP | 2009-94724 | | 4/2009 |
| JP | 2009-094724 | * | 4/2009 |
| JP | 2009-296323 | | 12/2009 |
| JP | 2011-28438 | | 2/2011 |

* cited by examiner

STEREOSCOPIC VIDEO IMAGING SYSTEM AND SYNCHRONOUS CONTROL METHOD

TECHNICAL FIELD

The present disclosure relates to a stereoscopic video imaging system and a synchronous control method that are suitable for use in the case where, for example, a stereoscopic video (3D video) is generated from videos captured with two cameras.

BACKGROUND ART

From the past, there has been a technique of generating a stereoscopic video (3D video) that can be stereoscopically viewed by a user with use of videos of the same subject. Those videos are captured with two cameras installed in accordance with parallax of right and left eyes of the user.

As an example of the stereoscopic video imaging system, there is a system in which videos of reflected light and transmitted light are captured with right and left cameras through a half mirror mounted to a mount called rig. When a stereoscopic video is captured using a rig, it is necessary for the two cameras used to coincide with each other in settings thereof and to be synchronized with each other in order to prevent generation of a difference between videos captured with the right and left cameras.

In the related art, two cameras are connected to each other through a cable for transmitting a genlock (generator lock) signal (synchronization signal) that is used for synchronizing the two cameras. The two cameras synchronize processing frames of video signals thereof on the basis of the genlock signal. In addition, the two cameras are connected to each other through a cable for transmitting a time code signal that is used for synchronizing time codes of the two cameras. The time code is used for editing a moving image and the like. Generally, the time code is information on a time (hour, minute, and number of frames) from the start of shooting. The cable for the genlock signal and the cable for the time code signal each include two signal lines for input and output.

In another technique, as shown in FIG. 12, a camera 101 and a genlock signal generator 103 are connected to each other by a cable 104A, a camera 102 and the genlock signal generator 103 are connected to each other by a cable 104B, and the camera 101 and the camera 102 are connected to each other by a time code signal cable 105. Then, a genlock signal (Genlock in) generated in the genlock signal generator 103 is input to each of the cameras 101 and 102 so that the two cameras are synchronized with each other. In addition, an input and an output (TC in, TC out) of the time code signal are transmitted and received through the cable 105.

Further, in order to match camera setting values (shooting parameters) of two cameras with each other, a configuration file containing a setting value of one camera is stored in a memory card, and then the configuration file is called from the memory card by the other camera so that the settings of the two cameras are matched with each other. Alternatively, a camera operator needs to match the settings of the two cameras while comparing them with use of a menu or a remote operation apparatus (remote controller). Further, in order to almost simultaneously start recording in two cameras, a recording button of the camera main body or remote controller needs to be pressed at the same time in the two cameras.

To eliminate those inconveniences, Patent Literature 1 proposes the following technique.

In the technique disclosed in Patent Literature 1, when a main imaging apparatus is connected to another imaging apparatus via a communication means and a camera operator operates a first operation switch (presses a release button halfway down) of the main imaging apparatus, a shooting parameter value set for the main imaging apparatus is transferred to the other imaging apparatus so that a common shooting parameter value is also set for the other imaging apparatus automatically. Further, Patent Literature 1 discloses a technique of, when the camera operator operates a second operation switch (presses a release button all the way down), transmitting a shooting command to the other imaging apparatus and taking images at the same timing between those imaging apparatuses. With this technique, a shooting operation in a connection destination can be automatically performed almost at the same time as when a shooting operation with use of a main camera is performed.

CITATION LIST

Patent Literature

[PTL 1]
Japanese Patent Application Laid-open No. 2007-72210

SUMMARY OF INVENTION

However, in the related art, a lot of cables for connecting two cameras are used and shooting equipment becomes large. Further, it is necessary to load or remove a memory card for matching camera setting values of the two cameras and to store and recall setting values on a menu screen. In addition, it takes time and labor to check whether the setting values are actually the same or not in the two cameras. It should be noted that in a shooting method disclosed in Patent Literature 1, when a release button is pressed halfway down, a shooting parameter value set for the main imaging apparatus is transferred to the other imaging apparatus, and therefore the shooting parameter value is set for the other imaging apparatus immediately before the shooting, and the same shooting parameter value is constantly set for the main imaging apparatus and the other imaging apparatus in the shooting.

In view of the circumstances as described above, it is desirable to save time and effort for shooting preparation of two cameras that takes a stereoscopic video.

According to an embodiment of the present disclosure, there is provided a stereoscopic video imaging system including a first imaging apparatus, a second imaging apparatus coupled to the first imaging apparatus and arranged to take a 3D image. A single cable connects the first imaging apparatus to the second imaging apparatus. A switching device selects one of the first and second imaging apparatuses to be a main imaging apparatus and the remaining imaging apparatus to be a sub imaging apparatus. The main imaging apparatus is enabled to generate a synchronization signal, the synchronization signal being communicated to the sub imaging apparatus through the single cable.

According to another embodiment of the stereoscopic video imaging system the main imaging apparatus is enabled to generate a time code signal for matching a time code for the main imaging apparatus with a time code of the sub imaging apparatus, the time code signal being communicated to the sub imaging apparatus through the single cable.

According to another embodiment of the stereoscopic video imaging system the main imaging apparatus is enabled to generate a data signal containing a shooting parameter, the data signal being communicated to the sub imaging apparatus through the single cable.

According to another embodiment there is provided an imaging device having single cable, a receiver to receive signals from a main imaging apparatus through the single cable and a transmitter to transmit signals to a sub imaging apparatus through the single cable. A switching device can switch the imaging device to either a main imaging apparatus mode or a sub imaging apparatus mode and generate a 3D image in communication with a second imaging apparatus. When the imaging apparatus in the main imaging apparatus mode the imaging device is enabled to generate a synchronization code, the synchronization signal being communicated to the second imaging apparatus through the single cable and when in the sub imaging apparatus mode the imaging device is enabled to receive a synchronization code, the synchronization signal being communicated from the second imaging apparatus through the single cable.

According to another embodiment of the imaging device when in the main imaging apparatus mode the imaging device is enabled to generate a time code signal for matching a time code for the imaging apparatus with a time code of the sub imaging apparatus, the time code signal being communicated to the second imaging apparatus through the single cable and when in the sub imaging apparatus mode the imaging device is enabled to receive a time code signal, the time code signal being communicated from the second imaging apparatus through the single cable.

According to another embodiment of the imaging device when in the main imaging apparatus mode the imaging device is enabled to generate a data signal containing a shooting parameter, the data signal being communicated to the second imaging apparatus through the single cable and when in the sub imaging apparatus mode the imaging device is enabled to receive a data signal, the data signal being communicated from the second imaging apparatus through the single cable. According to the present disclosure, it is possible to save time and effort for shooting preparation of two imaging apparatuses that take a stereoscopic video.

DESCRIPTION OF EMBODIMENTS

Figure 1:
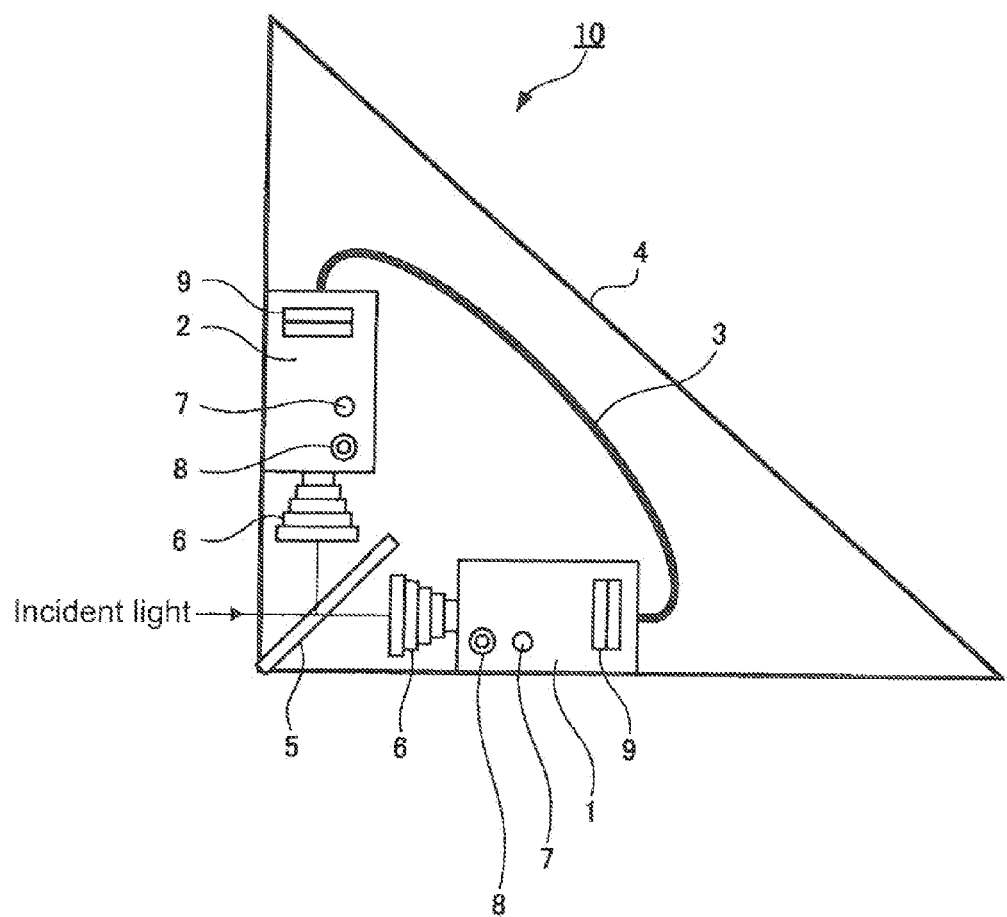
FIG. 1 is a block diagram showing an example of an external structure of a stereoscopic video imaging system according to an embodiment of the present disclosure.

Hereinafter, an example for carrying out the present disclosure (hereinafter, also referred to as "embodiment") will be described with reference to the attached drawings. Description will be given in the following order. It should be noted that in the drawings, common constituent elements are denoted by the same reference symbols and overlapping description will be omitted.
1. One Embodiment (example in which two imaging apparatuses are connected by single dedicated cable)
2. Others (example of reflecting camera setting value from main imaging apparatus to sub-imaging apparatus, and example of recording start and reproduction stop)

1. One Embodiment

External Structure of Stereoscopic Video Imaging System

In this embodiment, an example applied to a stereoscopic video imaging system 10 in which two imaging apparatuses (cameras) are connected to each other by a single dedicated cable to capture a stereoscopic video will be described (hereinafter, referred to as "this example").

FIG. 1 is a block diagram showing an example of an external structure of a stereoscopic video imaging system according to an embodiment of the present disclosure.

The stereoscopic video imaging system 10 includes a first imaging apparatus 1 and a second imaging apparatus 2 installed on a rig 4 as imaging apparatuses that capture two-dimensional videos with the same number of frames and the same image size in one second. Incident light from a subject is split into transmitted light and reflected light through a half mirror 5, and enters an optical system 6 of each of the imaging apparatus 1 and the imaging apparatus 2. The imaging apparatus 1 and the imaging apparatus 2 include a common terminal and are connected to each other by a single dedicated cable 3, which has been developed by the applicant of this application. The imaging apparatus 1 and the imaging apparatus 2 can transmit and receive a genlock (or generator lock) signal (synchronization signal) for controlling synchronization of video recording or reproducing processing in a unit of frames between those apparatuses, a time code signal used for editing a moving image, and the like.

Further, the first imaging apparatus 1 and the second imaging apparatus 2 each include an operation unit with which a camera operator instructs each unit to operate by inputting an operation. FIG. 1 illustrates, as an example of the operation unit, an assignable button 7 and a recording button 8. The imaging apparatus 1 and the imaging apparatus 2 each include a slot 9 for loading a memory card.

[Structure of Dedicated Cable]

Figure 2:
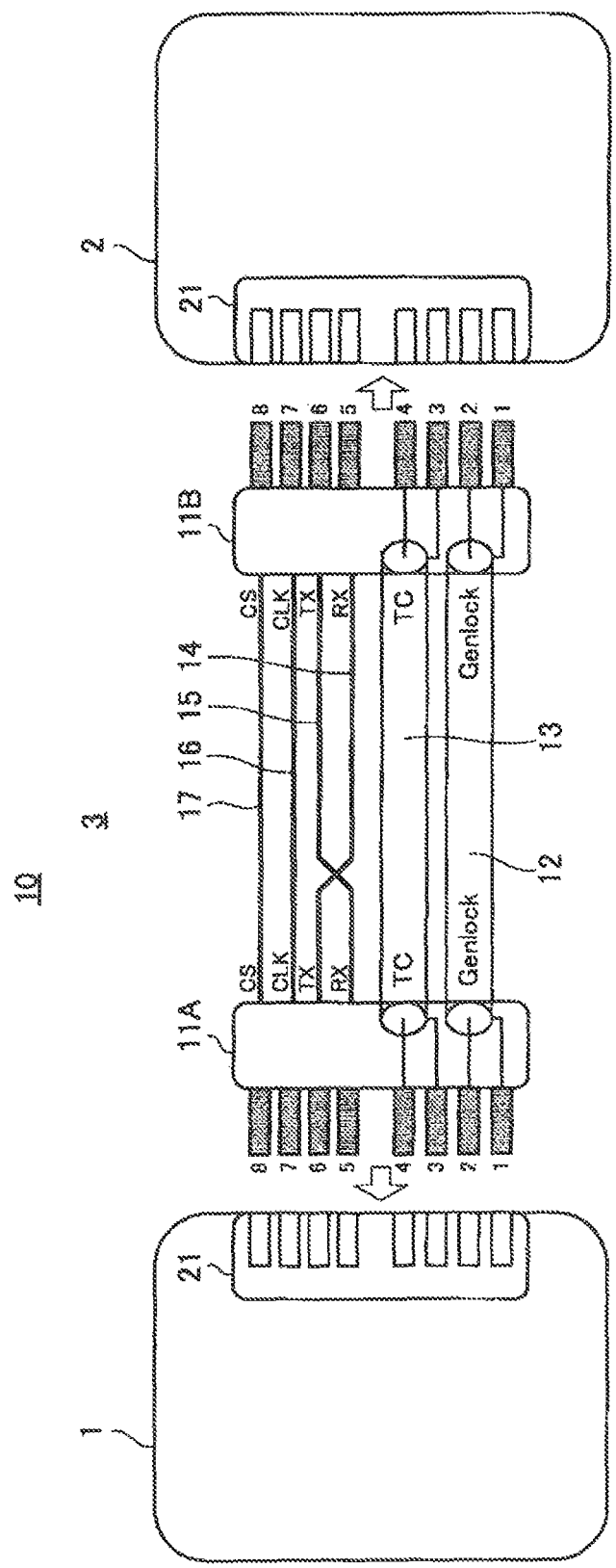
FIG. 2 is a schematic diagram showing a structure of a dedicated cable according to the embodiment of the present disclosure.
Figure 3:
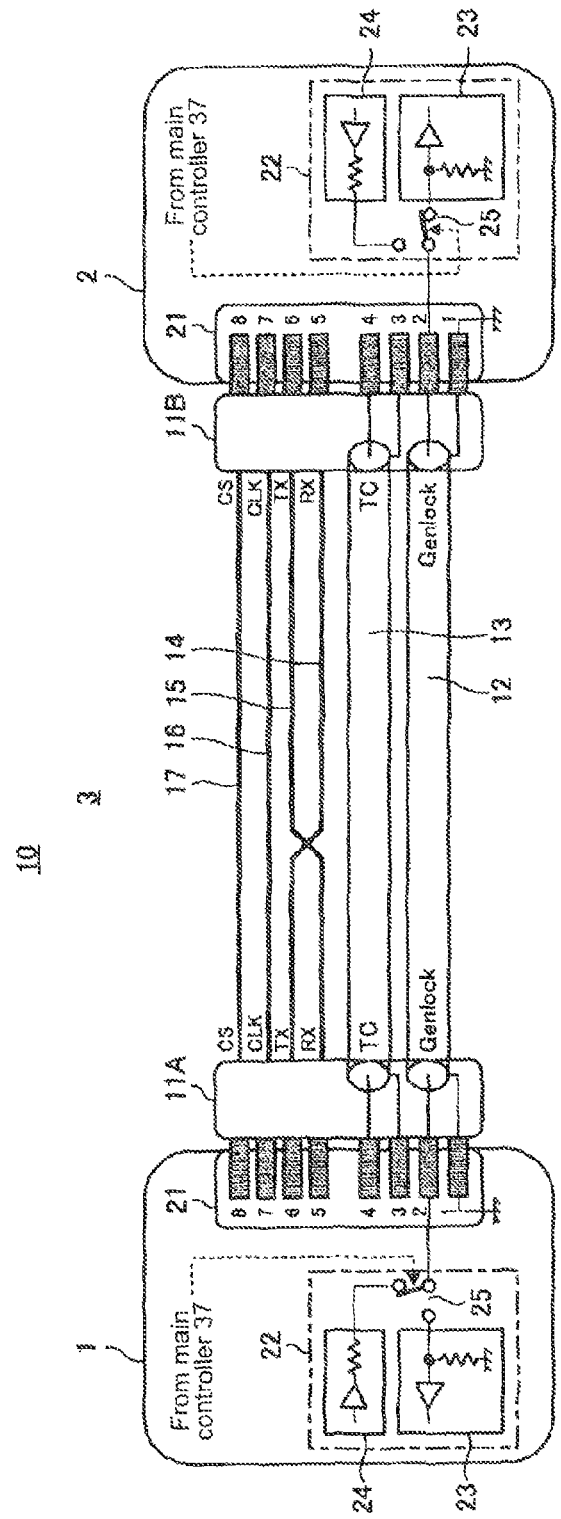
FIG. 3 is an explanatory diagram showing an example of an internal structure of an input circuit and an output circuit in an imaging apparatus according to the embodiment of the present disclosure.
Figure 4:
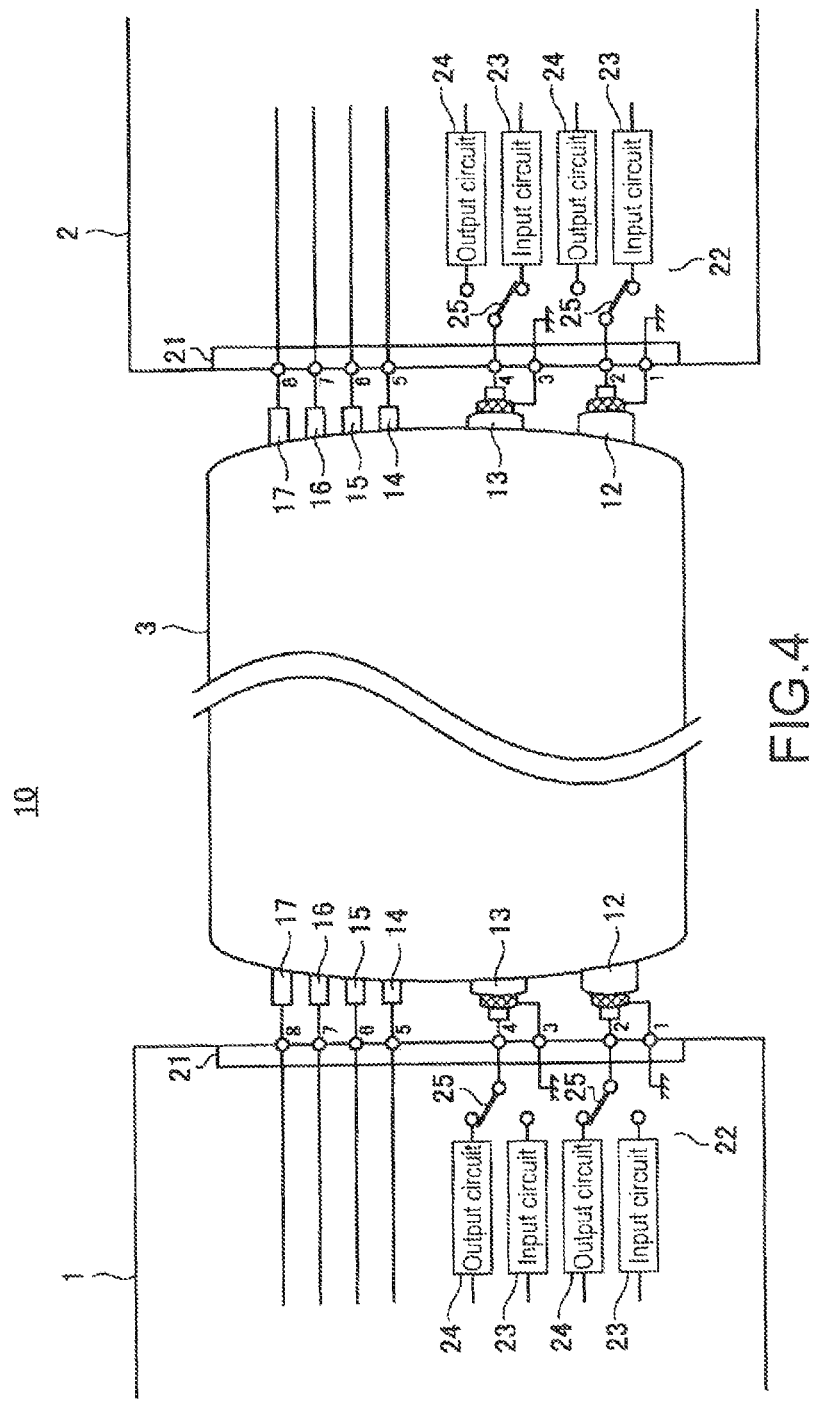
FIG. 4 is an explanatory diagram showing the input circuit and the output circuit in the imaging apparatus according to an embodiment of the present disclosure.

Next, with reference to FIGS. 2 to 4 and Table 1, a structure of the dedicated cable 3 according to the embodiment of the present disclosure will be described. FIG. 2 is a schematic diagram showing a structure of the dedicated cable 3. FIG. 3 is an explanatory diagram showing an example of an internal structure of an input circuit and an output circuit in an imaging apparatus. FIG. 4 is an explanatory diagram showing the input circuit and the output circuit in the imaging apparatus.

As shown in FIG. 2, the dedicated cable 3 includes, in a cylindrical protective covering 3a (see FIG. 3), a coaxial wire 12 for a genlock signal, a coaxial wire 13 for a time code signal, and four conductive wires 14 to 17 for data signals. Characteristic impedances of the coaxial wires 12 and 13 are 75Ω or 50Ω, for example. Male connectors 11A and 11B are provided to both ends of the dedicated cable 3. The connectors 11A and 11B each have the same structure and each include eight terminals (pins). Conduction between corresponding terminals of the two connectors 11A and 11B is established by those signal lines.

Table 1 shows names of signals that are input and output to and from the terminals of the connectors 11A and 11B of the dedicated cable 3.

TABLE 1

| Pin | Signal name | Remarks |
| --- | --- | --- |
| 1 | Genlock(GND) | Genlock signal |
| 2 | Genlock | |
| 3 | TC(GND) | Time code signal |
| 4 | TC | |
| 5 | RX | Data signal |
| 6 | TX | |
| 7 | CLK | |
| 8 | CS | |

As shown in Table 1, in this example, first pins of the connectors 11A and 11B of the dedicated cable 3 are assigned to a reference potential (Genlock(GND)) of a genlock signal, second pins thereof are assigned to the genlock signal (Genlock), third pins are assigned to a reference potential (TC(GND)) of a time code signal, fourth pins are assigned to the time code signal (TC), and fifth to eighth pins are assigned to a data signal. In this example, the fifth pins are assigned to reception data (RX), the sixth pins are assigned to transmission data (TX), the seventh pins are assigned to a clock signal (CLK), and the eighth pins are assigned to a chip select signal (CS).

Information items included in the reception data (RX) and the transmission data (TX) are an input operation signal of a recording start, a recording stop, or the like of the imaging apparatus 1 or the imaging apparatus 2, a control signal based thereon, a camera setting value (shooting parameter), and the like. The clock signal (CLK) is a signal that is used for a plurality of blocks in the imaging apparatus 1 or the imaging apparatus 2 to synchronize timings of operation. The chip select signal (CS) is a signal representing which hardware module (IC etc.) of the imaging apparatus 1 and the imaging apparatus 2 is enabled. When the chip select signal is active, read and write of the hardware module can be performed.

The connector 11A (male) of the dedicated cable 3 and a connector 21 (female) of the imaging apparatus 1 are connected to each other and the connector 11B (male) of the dedicated cable 3 and a connector 21 (female) of the imaging apparatus 2 are connected to each other so that the imaging apparatus 1 and the imaging apparatus 2 are physically and electrically connected to each other.

[Switching Between Input Circuit and Output Circuit]

In the stereoscopic video imaging system according to the embodiment of the present disclosure, the two imaging apparatuses 1 and 2 are connected to each other by the single dedicated cable 3, and a genlock signal, a time code signal, and a data signal are transmitted by the single cable so that settings of the cameras, synchronization, recording start/stop, and the like can be performed. Hereinafter, a structure for switching between the input circuit and the output circuit in the imaging apparatus will be described.

As shown in FIGS. 3 and 4, when the connector 11A (male) of the dedicated cable 3 is inserted into the connector 21 (female) of the imaging apparatus 1, the terminals (first to eighth pins) of the connector 11A and the terminals (first to eighth pins) corresponding thereto of the imaging apparatus 1 are physically and electrically connected to one another. Similarly, when the connector 11B (male) of the dedicated cable 3 is inserted into the connector 21 (female) of the imaging apparatus 2, the terminals (first to eighth pins) of the connector 11B and the terminals (first to eighth pins) corresponding thereto of the imaging apparatus 2 are physically and electrically connected to one another.

Since the imaging apparatus 1 and the imaging apparatus 2 are connected to each other by a single dedicated cable 3, it is necessary to set an input side (main apparatus side) and an output side (sub-apparatus side) for the imaging apparatus 1 and the imaging apparatus 2. In the example shown in FIG. 3, the imaging apparatus 1 is set to be an input side, and the imaging apparatus 2 is set to be an output side. The setting of those two imaging apparatuses 1 and 2 may be reversed between the input side and the output side depending on a shooting condition or the intention of the camera operator. Hereinafter, an internal structure of the imaging apparatus for switching the setting will be described. The imaging apparatus 1 and the imaging apparatus 2 have the same structure, and therefore the imaging apparatus 1 will be described here.

As shown in FIG. 3, a center core (inner conductor) of the coaxial wire 12 of the dedicated cable 3 is connected to the second terminal (second pin) of the connector 21, and an outer conductor thereof is connected to the first terminal (first pin) of the connector 21. The outer conductor is basically a reference of a zero-volt potential. Therefore, the first terminal is connected to an electronic circuit of the imaging apparatus connected via an outer metallic part of the connector 21 or to a ground wire of a casing of the imaging apparatus. Further, the second terminal of the connector 21 is connected to a connector interface 22 (hereinafter, also referred to as "connector I/F" or "input and output I/F"). It should be noted that in this example, ground wires for the data signals transmitted through the four conductive wires 14 to 17 are shared with the outer conductors of the coaxial wires 12 and 13.

The connector I/F 22 includes an input circuit 23, an output circuit 24, and a switching unit 25. The input circuit 23 and the output circuit 24 are connected to an electronic circuit (not shown) of the imaging apparatus. The fifth to eighth terminals of the connector 21 are also connected to the electronic circuit of the imaging apparatus.

As an example, the input circuit 23 can be structured by a buffer amplifier (amplifier circuit) in which an input terminal thereof is connected to the switching unit 25 and an output terminal thereof is connected to the electronic circuit of the imaging apparatus, and a resistor (termination resistor) in which one terminal is connected between the switching unit 25 and the buffer amplifier and the other terminal is connected to the ground wire. For the termination resistor, a resistance value of 75Ω or 50Ω is used in accordance with an impedance of the coaxial wire for the purpose of impedance matching.

As an example, the output circuit 24 can be structured by a buffer amplifier (amplifier circuit) in which an input terminal thereof is connected to the electronic circuit of the imaging apparatus, and a resistor (output resistor) in which one terminal is connected to an output terminal of the buffer amplifier and the other terminal is connected to the switching unit 25. For the output resistor, a resistance value of 75Ω or 50Ω is used in accordance with an impedance of the coaxial wire for the purpose of impedance matching.

The switching unit 25 switches connection between the input circuit 23 and the output circuit 24 according to an instruction from the main controller 37. Accordingly, the imaging apparatus can be switched between the input side (main apparatus side) and the output side (sub-apparatus side).

The same holds true for the fourth terminal (fourth pin) of the connector 21 connected to the center core (inner conductor) of the coaxial wire 13 of the dedicated cable 3, and the third terminal (third pin) connected to the outer conductor thereof. The connector I/F 22 includes another input circuit 23, another output circuit 24, and another switching unit 25. The input circuit 23 and the output circuit 24 are connected to the electronic circuit of the imaging apparatus. The switching unit 25 is connected to the fourth terminal. Connection is switched between the input circuit 23 and the output circuit 24 by the switching unit 25.

It should be noted that the present disclosure is not limited to this example showing the structure in which switching between the input circuit 23 and the output circuit 24 is performed by using a single switching unit 25. For example, the following structure may be adopted, in which a buffer amplifier and a resistor are shared between the input circuit 23 and the output circuit 24, a plurality of switching units are provided, and connection is switched among the plurality of switching units in accordance with a setting so that the orientation of the buffer amplifier and the function of the resistor (output resistor and termination resistor) are selected.

[Internal Structure of Stereoscopic Video Imaging System]

Next, an example of an internal structure of the stereoscopic video imaging system 10 will be described.

Figure 5:
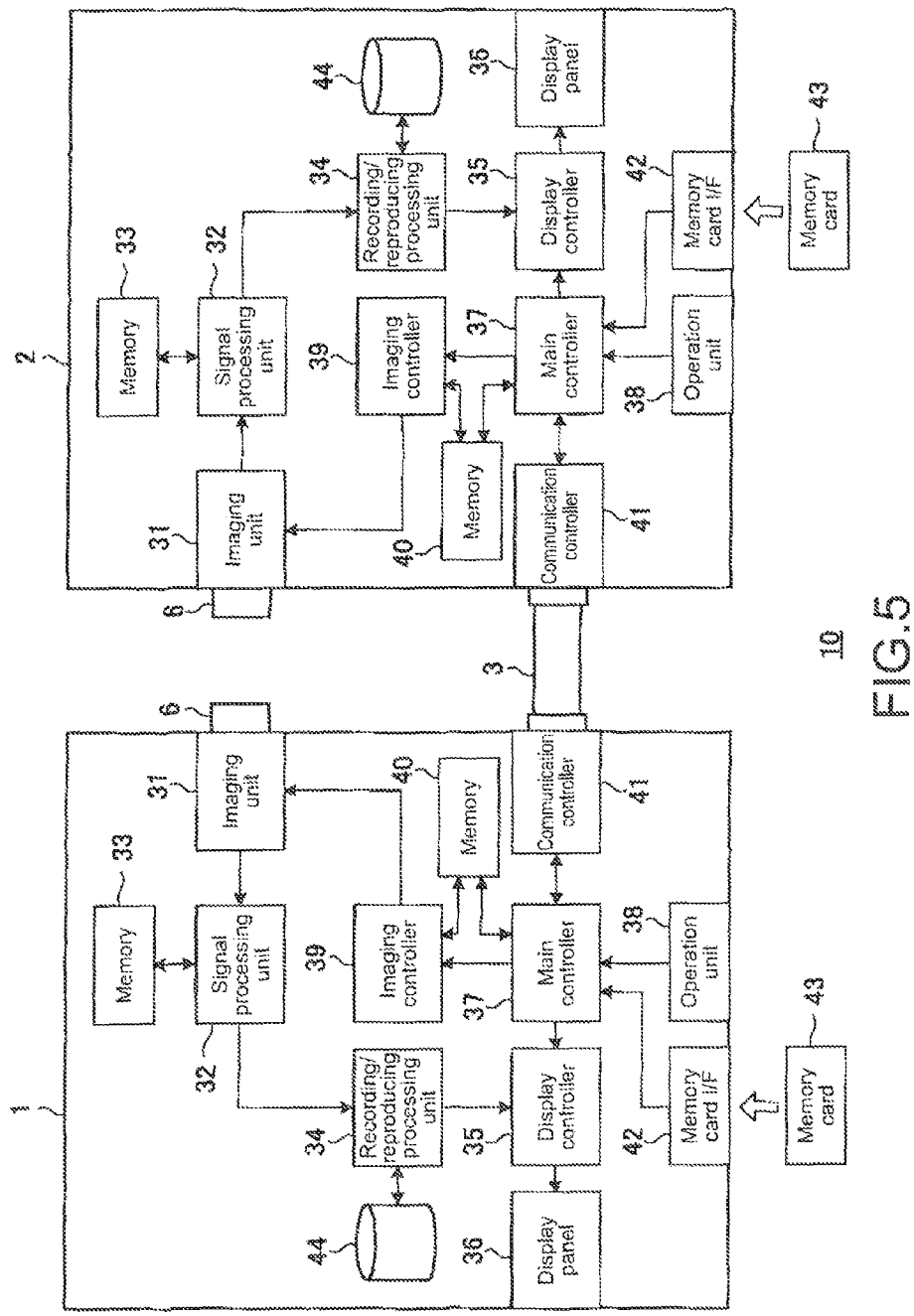
FIG. 5 is a block diagram showing an example of an internal structure of the stereoscopic video imaging system according to the embodiment of the present disclosure.

FIG. 5 is a block diagram showing an example of an internal structure of the stereoscopic video imaging system 10 according to the embodiment of the present disclosure. Since the imaging apparatus 1 and the imaging apparatus 2 that are connected to each other by the dedicated cable 3 have the same functional blocks, an example of an internal structure of the imaging apparatus 1 will be described here. In the following description, the imaging apparatus set on the input side (main apparatus side) is referred to as "main apparatus" and the imaging apparatus set on the output side (sub-apparatus side) is referred to as "different apparatus" in some cases.

The imaging apparatus 1 includes an imaging unit 31 constituted of an image sensor, a circuit for reading out an imaging signal from the image sensor, and the like. The image sensor included in the imaging unit 31 converts image light that has entered via a lens of an optical system 6 mounted to the imaging apparatus 1 into an electric imaging signal. An imaging timing, an imaging cycle, an imaging operation in the imaging unit 31 are controlled by an imaging controller 39. The imaging controller 39 controls the imaging unit 31 so that imaging is performed based on a camera setting value (shooting parameter) stored in a memory 40 or an instruction from an operation unit 38 that is input via the main controller 37 (one example of controller). The camera setting value based on the operation of the operation unit 38 or the like is stored in the memory 40.

The imaging signal output from the imaging unit 31 is input to a signal processing unit 32. The signal processing unit 32 performs various types of signal processing on the input imaging signal and outputs the resultant signal as a video signal to a recording/reproducing processing unit 34. A memory 33 is connected to the signal processing unit 32 and temporarily stores data of the video signal in order to perform signal processing in the signal processing unit 32.

The recording/reproducing processing unit 34 converts the video signal input from the signal processing unit 32 into a video signal of a predetermined output format and outputs the obtained video signal to a large capacity storage 44 in the recording or to a display controller 35 in the reproduction. As the large capacity storage, a hard disk, a semiconductor memory, or the like is used. It should be noted that in the recording/reproducing processing unit 34, the imaging signal (raw data) output from the imaging unit 31 may be output as an output video signal as it is to the display controller 35, without performing format conversion of the video signal.

In this example, a chroma burst signal in a video signal (VBS) with a chroma burst signal, which is generated in the recording/reproducing processing unit 34, is used as a synchronization reference signal, that is, a genlock signal (Genlock). It should be noted that when the imaging apparatus 1 or 2 is set on the main apparatus side (input side), a circuit for generating a genlock signal (Genlock) (not shown) and a circuit for generating a time code signal (TC) (not shown) may be separately provided within the imaging apparatus.

In the display controller 35, a drive signal is generated from the supplied video signal in accordance with a display method, a resolution, and the like of a display panel 36, and then supplied to the display panel 36. The display panel 36 serving as a viewfinder displays a video on the screen on the basis of the supplied drive signal. As the display panel 36, for example, a FPD (Flat Panel Display) such as a liquid crystal display panel is used.

As the operation unit 38, for example, an operation switch (assignable button 7, recording button 8, etc.) provided to the camera main body, and a remote controller, a push button, a toggle switch, a touch panel display, and the like (that are not shown) are used. An input operation signal from the operation unit 38 is input to the main controller 37 via an interface unit (not shown).

The memory card 43 is to record data of the camera setting value, captured video data, and the like. When the memory card 43 in which the data of the camera setting value is stored is inserted into a memory card interface (memory card I/F) 42, the main controller 37 stores the data of the camera setting value in the memory 40.

A communication controller 41 controls communication between the main apparatus (imaging apparatus 1) and a different apparatus (imaging apparatus 2). In other words, the communication controller 41 transmits a genlock signal, a time code signal, and a data signal output from the main controller 37 of the main apparatus to the different apparatus, and conversely receives a genlock signal, a time code signal, and a data signal from the different apparatus to input those signals to the main controller 37. In the following description, when the imaging apparatus 1 and the imaging apparatus 2 performs communication with each other, description on the communication controller 41 of each imaging apparatus may be omitted.

Further, the imaging apparatuses 1 and 2 each include a commercial power supply or a power supply unit (not shown) that receives power from a battery, and supply power to the blocks. Supply and stop of power with respect to the blocks are performed by pressing a power supply button (not shown) of the operation unit 38, for example.

[Example of Internal Structure of Main Controller]

Next, an example of an internal structure of the main controller 37 will be described.

Figure 6:
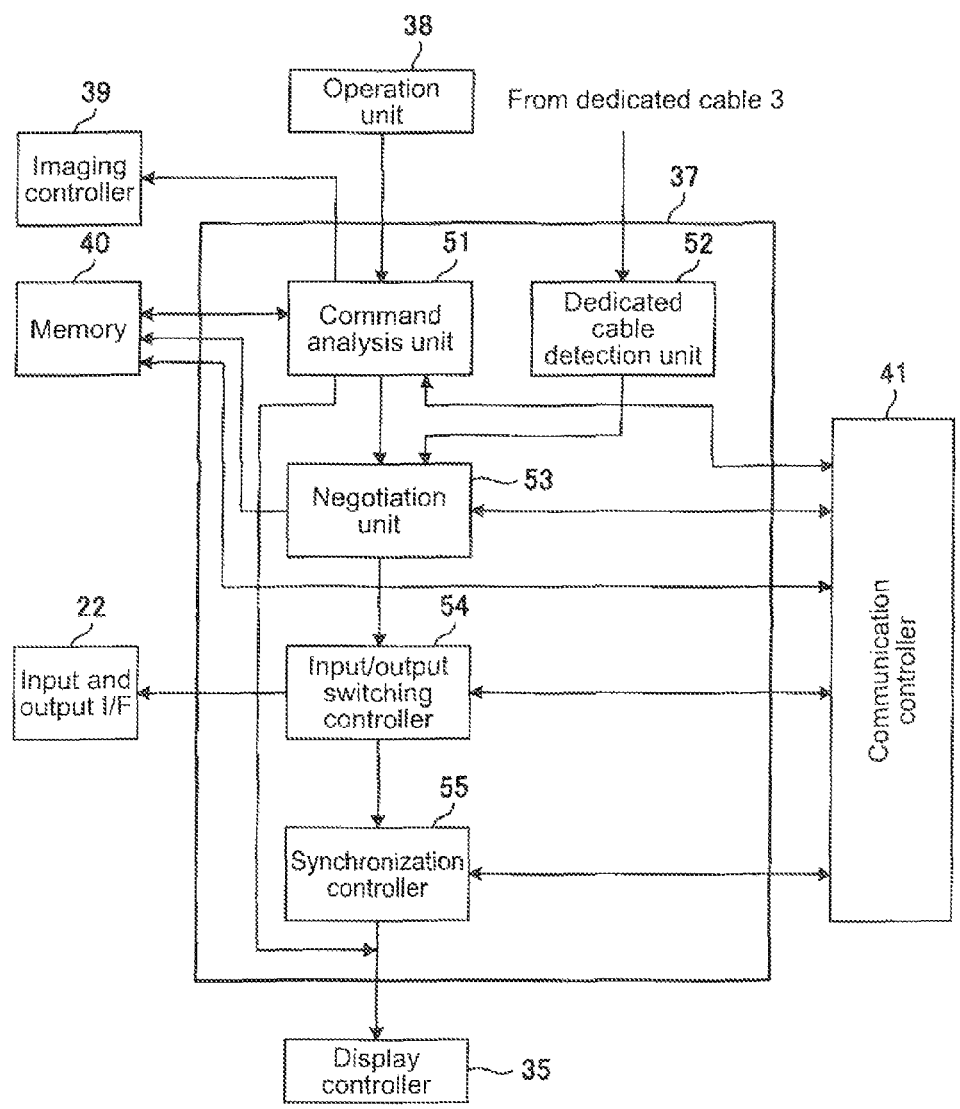
FIG. 6 is a block diagram showing an example of an internal structure of a main controller according to the embodiment of the present disclosure.

FIG. 6 is a block diagram showing an example of an internal structure of the main controller 37 according to the embodiment of the present disclosure. The main controller 37 includes a command analysis unit 51, a dedicated cable detection unit 52, a negotiation unit 53, an input/output switching controller 54, and a synchronization controller 55. For the main controller 37, an arithmetic control device such as an MPU (Micro-Processing Unit) can be used.

The command analysis unit 51 analyzes a command contained in an operation input signal from the operation unit 38 and sends the result of analysis to the blocks. Further, based on the result of analysis, the command analysis unit 51 reads out data such as a camera setting value (shooting parameter) from the memory 40 to output a control signal to the imaging controller 39, or stores data in the memory 40. Further, the command analysis unit 51 exchanges data with the communication controller 41.

The dedicated cable detection unit 52 detects whether the connector 11A of the dedicated cable 3 is inserted into the connector 21 of the imaging apparatus 1, and notifies the negotiation unit 53 of the result of the detection. As an example, in the case where a resistor is connected between predetermined terminals of the connector 11A of the dedicated cable 3, when the dedicated cable 3 is connected to the imaging apparatus 1, it is possible to check that the dedicated cable 3 is connected to the imaging apparatus 1, based on whether the dedicated cable detection unit 52 has detected a signal of current or voltage corresponding to the resistor. Alternatively, it may be possible to transmit a preset signal from the main imaging apparatus to the sub-imaging apparatus and then determine the connection based on whether the signal has been received.

The negotiation unit 53 exchanges information on a setting of the main apparatus (imaging apparatus 1) or the different apparatus (imaging apparatus 2) with the other negotiation unit 53, before performing negotiation processing between those imaging apparatuses, that is, starting communication therebetween. The information on the setting also contains setting information of a main imaging apparatus or a sub-imaging apparatus of each imaging apparatus, in addition to communication setting information of each imaging apparatus. When receiving from the command analysis unit 51 notification indicating that a stereoscopic video imaging mode is selected, and receiving from the dedicated cable detection unit 52 notification indicating that the dedicated cable 3 is connected to the imaging apparatus 1, the negotiation unit 53 executes negotiation processing. Information on the setting of the different apparatus, which has been received through the negotiation processing, is stored in the memory 40.

After receiving from the negotiation unit 53 the notification indicating that the negotiation is ended, the input/output switching controller 54 performs control such that the input circuit 23 and the output circuit 24 of the input and output I/F 22 (see FIGS. 3 and 4) are switched. The input/output switching controller 54 instructs switching between the input circuit 23 and the output circuit 24 of the main apparatus and also instructs switching between the input circuit 23 and the output circuit 24 of the different apparatus.

After receiving from the input/output switching controller 54 the notification indicating that the switching between the input circuit 23 and the output circuit 24 is ended, the synchronization controller 55 performs control such that the main apparatus and the different apparatus are synchronized with each other. In this example, the synchronization controller 55 transmits and receives a genlock signal and a time code signal with respect to the different apparatus via the communication controller 41 to synchronize the generator lock signals and time code signals.

The display controller 35 generates a drive signal in accordance with the analysis result of the operation input signal input from the command analysis unit 51 or an input from the synchronization controller 55 and supplies the drive signal to the display panel 36.

The internal structure of the imaging apparatus 1 has been described above. The imaging apparatus 2 also has the same structure.

[Processing Example Up to Completion of Shooting Preparation]

Figure 7:
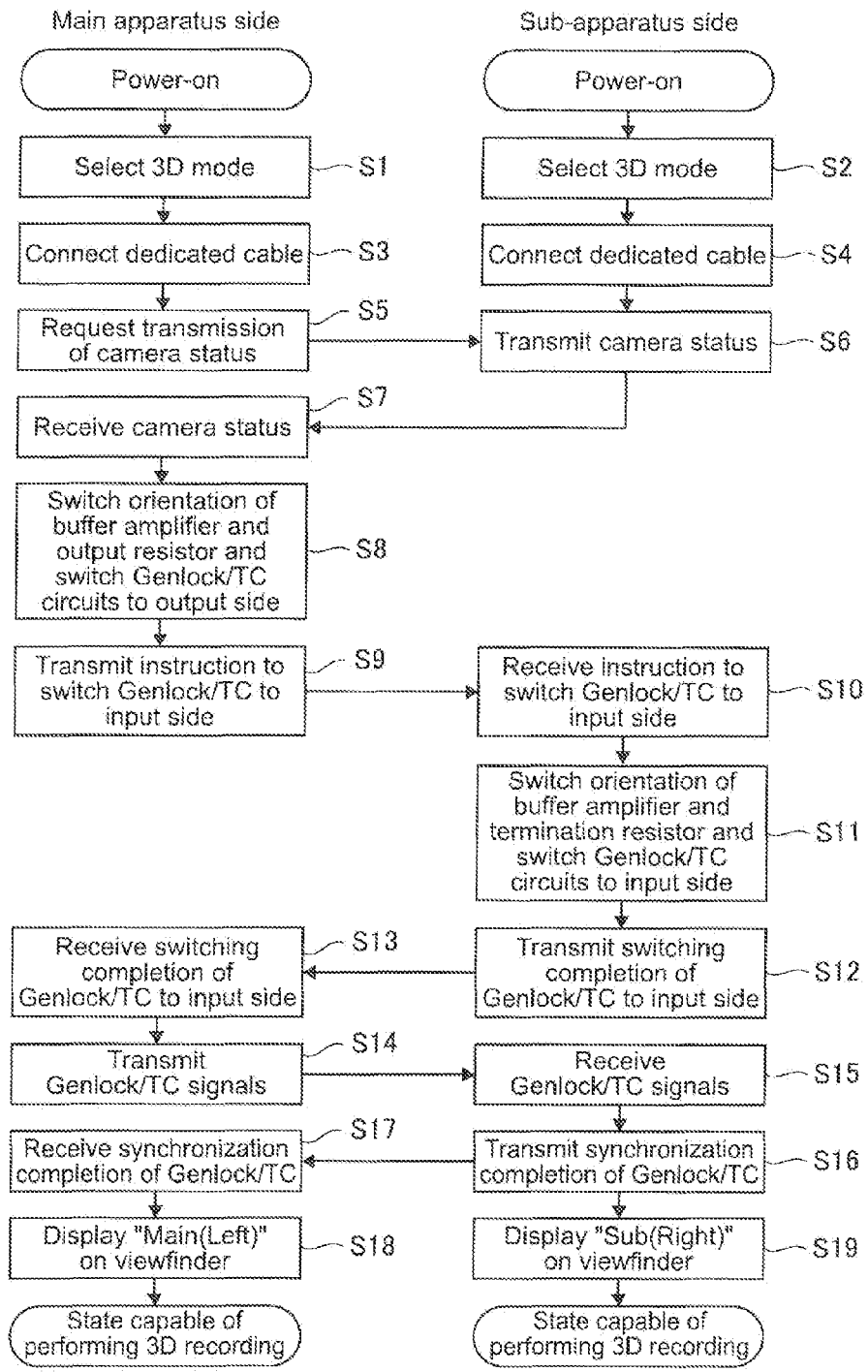
FIG. 7 is a flowchart showing a processing example up to completion of shooting preparation of two imaging apparatuses connected to each other by a dedicated cable according to the embodiment of the present disclosure.

Next, processing example up to completion of shooting preparation of the two imaging apparatuses 1 and 2 connected to each other by the dedicated cable 3 will be described with reference to a flowchart of FIG. 7.

A camera operator first presses a power supply button of the imaging apparatus 1 to turn on the imaging apparatus 1. At this point, it has not been determined which of the imaging apparatus 1 and the imaging apparatus 2 is a main imaging apparatus (input side) or a sub-imaging apparatus (output side). In the following description, it is assumed that the imaging apparatus 1 is set to be a main imaging apparatus and the imaging apparatus 2 is set to be a sub-imaging apparatus.

Next, the camera operator selects a stereoscopic video imaging mode from a menu of the imaging apparatus 1 (Step S1). Then, the camera operator sets the imaging apparatus 1 to be an imaging apparatus on the main apparatus side, for example. The command analysis unit 51 of the main controller 37 of the imaging apparatus 1 analyzes an input operation signal from the operation unit 38, determines that the imaging apparatus 1 has been set to be a main imaging apparatus, and stores the details on the setting in the memory 40.

Figure 8:
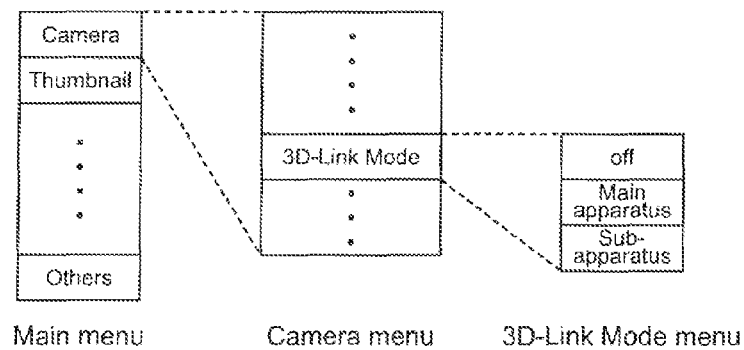
FIG. 8 is an explanatory diagram showing a transition example of a menu screen of a viewfinder according to the embodiment of the present disclosure.

At the time of setting, the camera operator operates the operation unit 38 to display a menu screen as shown in FIG. 8, for example, on the display panel 36 and makes setting. The camera operator first displays a main menu on the screen and selects "camera" that is a menu item for shooting, to display a camera menu on the right-hand side of the main menu. The camera operator selects, from the camera menu, a "3D-Link Mode" that is a stereoscopic video imaging mode, and displays a 3D-Link Mode menu on the right-hand side of the camera menu. The camera operator selects "main" from a plurality of menu items of the 3D-Link Mode menu, to thereby set the imaging apparatus 1 to be an imaging apparatus on the main apparatus side (input side).

In the same way, the camera operator turns on the imaging apparatus 2, and then selects a stereoscopic video imaging mode from a menu of the imaging apparatus 2 (Step S2) and sets the imaging apparatus 2 to be an imaging apparatus on the sub-apparatus side (output side).

It should be noted that the following structure may be adopted: the settings of a main apparatus and a sub-apparatus with respect to the two imaging apparatuses 1 and 2 are executed and stored in the memory 40 in advance, and when the imaging apparatuses 1 and 2 are turned on, those imaging apparatuses call the settings from the memory 40.

Next, the camera operator connects the connector 11A of the dedicated cable 3 to the connector 21 of the imaging apparatus 1, and connects the connector 11B of the dedicated cable 3 to the connector 21 of the imaging apparatus 2.

In the imaging apparatus 1, the main controller 37 (dedicated cable detection unit 52) detects that the connector 11A of the dedicated cable 3 has been inserted into the connector 21 of the imaging apparatus 1 (Step S3). Similarly, also in the imaging apparatus 2, the main controller 37 (dedicated cable detection unit 52) detects that the connector 11B of the dedicated cable 3 has been inserted into the connector 21 of the imaging apparatus 2 (Step S4). It should be noted that the processing of selecting the stereoscopic video imaging mode in Steps S1 and S2 and the processing of connecting the dedicated cable 3 in Steps S3 and S4 may be performed in reverse order.

After the dedicated cable 3 is connected to the imaging apparatus 1 and the imaging apparatus 2, negotiation processing is performed between the imaging apparatus 1 and the imaging apparatus 2.

The main controller 37 (negotiation unit 53) of the imaging apparatus 1 requests the imaging apparatus 2 to transmit information on the setting of the imaging apparatus (Step S5). The main controller 37 (negotiation unit 53) of the imaging apparatus 2 receives the request and sends back the information on the setting of the imaging apparatus 2 to the imaging apparatus 1 (Step S6). The main controller 37 (negotiation unit 53) of the imaging apparatus 1 receives the information sent back and stores the information on the setting of the imaging apparatus 2 in the memory 40 (Step S7).

After the negotiation processing is ended, the main controller 37 (input/output switching controller 54) of the imaging apparatus 1 switches the switching unit 25 (first switching unit) of the input and output I/F 22 to the output circuit 24 side (Step S8). With this operation, an orientation of the buffer amplifier and the resistor (output resistor) are switched and a genlock circuit and a time code circuit are switched to the output side. After the switching, the main controller 37 (input/output switching controller 54) of the imaging apparatus 1 transmits, to the imaging apparatus 2, a command for instructing switching of a genlock circuit and a time code circuit to the input side (Step S9).

The main controller 37 (input/output switching controller 54) of the imaging apparatus 2 receives, from the imaging apparatus 1, the command for instructing switching of a genlock circuit and a time code circuit to the input side (Step S10). Upon reception of the command, the main controller 37 (input/output switching controller 54) of the imaging apparatus 2 switches the switching unit 25 (second switching unit) of the input and output I/F 22 to the output circuit 24 side (Step S11). With this operation, an orientation of the buffer amplifier and the resistor (termination resistor) are switched and the genlock circuit and the time code circuit are switched to the input side. After the switching, the main controller 37 (input/output switching controller 54) of the imaging apparatus 2 transmits, to the imaging apparatus 1, a command indicating that the switching of the genlock circuit and the time code circuit to the input side has been completed (Step S12).

The main controller 37 (input/output switching controller 54) of the imaging apparatus 1 receives, from the imaging apparatus 2, the command indicating that the switching of the genlock circuit and the time code circuit to the input side has been completed (Step S13).

In the processing in Step S1 to S13 described above, communication between the imaging apparatus 1 and the imaging apparatus 2 is performed using the conductive wire 14 (for reception signal (RX)) and the conductive wire 15 (for transmission signal (TX)) of the dedicated cable 3.

Next, the main controller 37 (synchronization controller 55) of the imaging apparatus 1 transmits a genlock signal to the imaging apparatus 2 through the coaxial wire 12 of the dedicated cable 3. Further, the main controller 37 (synchronization controller 55) of the imaging apparatus 1 transmits a time code signal to the imaging apparatus 2 through the coaxial wire 13 of the dedicated cable 3 (Step S14).

The main controller 37 (synchronization controller 55) of the imaging apparatus 2 receives the genlock signal and the time code signal from the imaging apparatus 1 through the dedicated cable 3 for synchronization (Step S15). When receiving the genlock signal and the time code signal from the imaging apparatus 1 and completing synchronization, the main controller 37 (synchronization controller 55) of the imaging apparatus 2 transmits a command indicating that the synchronization has been completed to the imaging apparatus 1 through the conductive wire 15 of the dedicated cable 3 (Step S16).

The main controller 37 (synchronization controller 55) of the imaging apparatus 1 receives, from the imaging apparatus 2, the command indicating that the synchronization of the genlock signal and the time code signal has been completed, through the conductive wire 15 of the dedicated cable 3 (Step S17).

Figure 9:
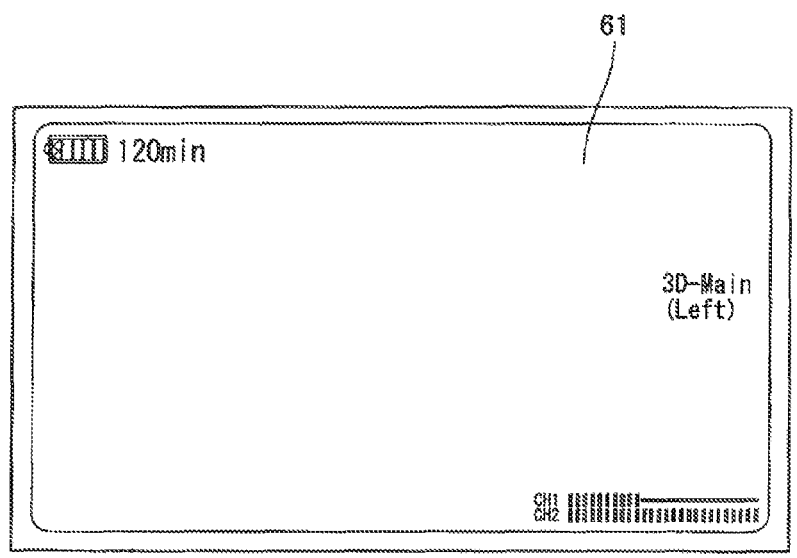
FIG. 9 is an explanatory diagram showing a display example of a viewfinder of the imaging apparatus on a main apparatus side according to the embodiment of the present disclosure.

The main controller 37 of the imaging apparatus 1 instructs the display controller 35 to display a screen indicating that the imaging apparatus 1 is set on a main apparatus side (output side) (Step S1). Upon reception of the instruction, the display controller 35 outputs a drive signal to the display panel 36 so that a screen 61 (see FIG. 9) indicating that the imaging apparatus 1 is the main apparatus is displayed on the viewfinder. Further, when shooting is performed such that a captured video is recorded as a stereoscopic video, a status as to whether the imaging apparatus 1 is on the left- or right-hand side is also displayed on the viewfinder. In this example, the imaging apparatus 1 is set so as to correspond to the left eye, and therefore "Left" is displayed together with "3D-Main".

Figure 10:
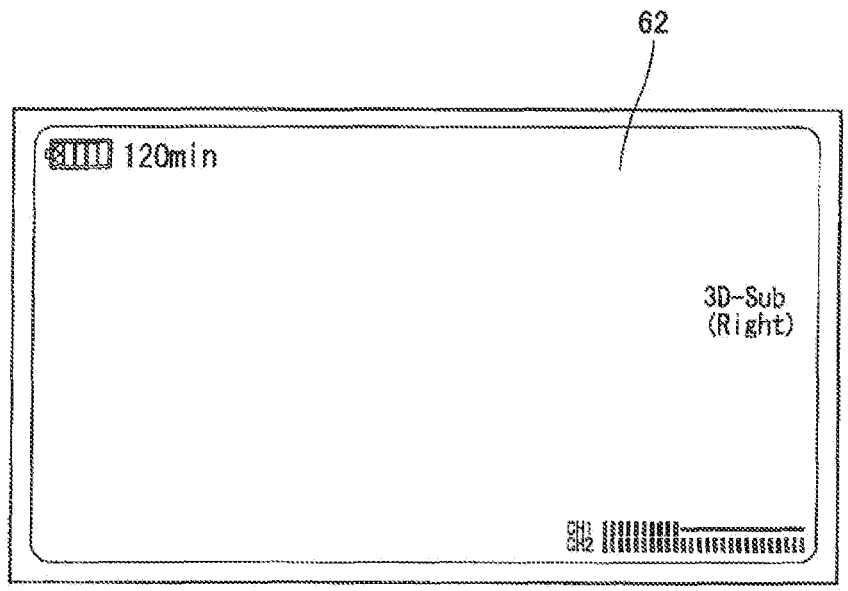
FIG. 10 is an explanatory diagram showing a display example of a viewfinder of the imaging apparatus on a sub-apparatus side according to the embodiment of the present disclosure.

In parallel to the display of the imaging apparatus 1, the main controller 37 of the imaging apparatus 2 instructs the display controller 35 to display a screen indicating that the imaging apparatus 2 is set on a sub-apparatus side (input side) (Step S19). Upon reception of the instruction, the display controller 35 outputs a drive signal to the display panel 36 so that a screen 62 (see FIG. 10) indicating that the imaging apparatus 2 is the sub-apparatus is displayed on the viewfinder. In this example, the imaging apparatus 2 is set so as to correspond to the right eye, and therefore "Right" is displayed together with "3D-Sub".

Through the various types of processing described above, the imaging apparatus 1 and the imaging apparatus 2 enter the state in which the imaging apparatus 1 and the imaging apparatus 2 can capture a stereoscopic video.

As described above, according to an embodiment of the present disclosure, there is provided a structure in which, in the case where two imaging apparatuses are connected to each other by a dedicated cable and the two imaging apparatuses are set to be a main apparatus and a sub-apparatus, input circuits and output circuits provided to the respective input and output I/Fs of the imaging apparatuses are switched. Therefore, even if any of the two imaging apparatuses is set to be the main apparatus or the sub-apparatus, the two imaging apparatuses can be caused to function as a stereoscopic video imaging system.

With this structure, a single conductive wire (for example, coaxial wire) for transmitting a genlock signal and a single conductive wire (for example, coaxial wire) for transmitting a time code signal only need to be prepared in a single dedicated cable. In other words, one cable is connected between two imaging apparatuses, with the result that the two imaging apparatuses are synchronized with each other and the time codes are matched with each other.

Therefore, a plurality of conductive wires for synchronizing the two imaging apparatuses and matching time codes are integrated into one cable, with the result that the number of cables can be reduced. Therefore, since it is unnecessary to connect the plurality of cables to the two imaging apparatuses of the stereoscopic video imaging system, time and effort for shooting preparation can be saved.

2. Others

Figure 11:
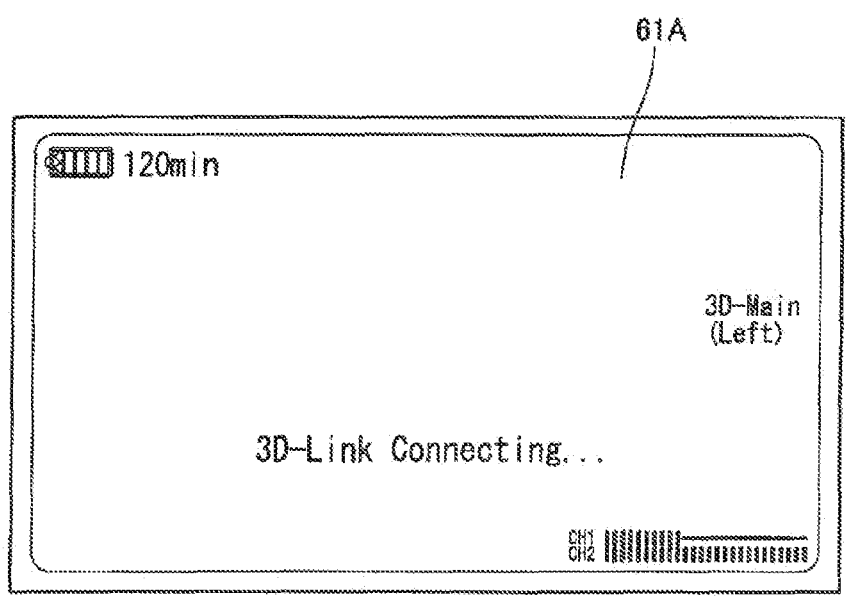
FIG. 11 is an explanatory diagram showing a display example of the viewfinder (on the main apparatus side), in which a setting value is being reflected, according to the embodiment of the present disclosure.
Figure 12:
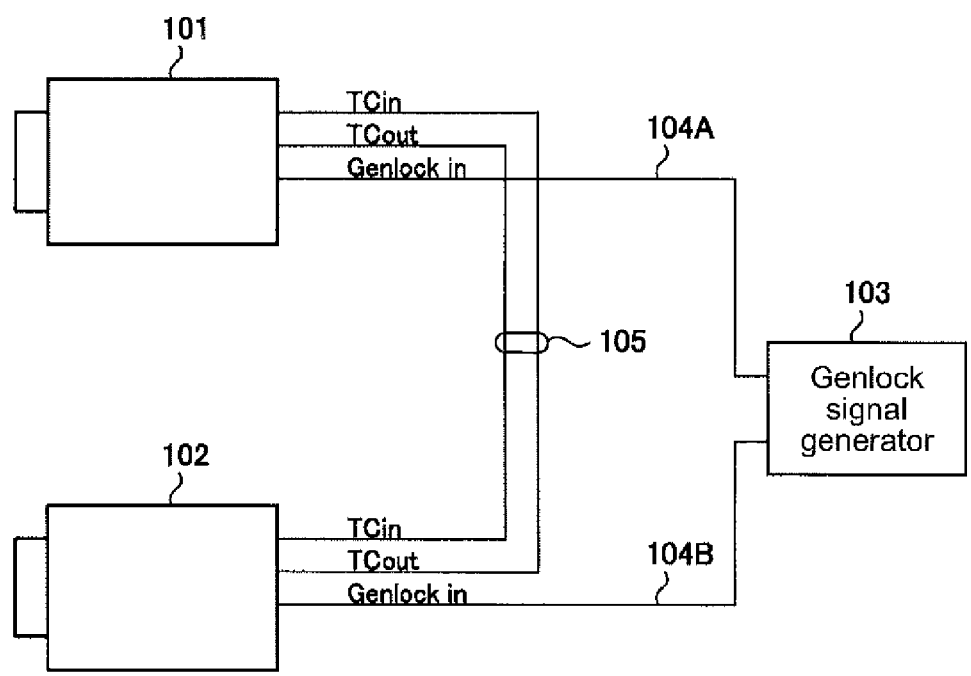
FIG. 12 is an explanatory diagram showing an example of a method of connecting two imaging apparatuses in related the art.

Example of Reflecting Camera Setting Value from Main Imaging Apparatus to Sub-Imaging Apparatus After the genlock signals and the time code signals are synchronized in the two imaging apparatuses 1 and 2, when the assignable button 7 (to which a function of transmitting setting data of the main imaging apparatus has been assigned) of the imaging apparatus 1 set to be a main apparatus is pressed, a camera setting value (shooting parameter) of the imaging apparatus 1 is transmitted to the imaging apparatus 2 as a sub-apparatus and stored in the memory 40. Accordingly, the camera setting value of the imaging apparatus 1 is reflected on the imaging apparatus 2. Items of camera setting that are to be transmitted at that time include, for example, a shutter timing, gamma correction, white balance, a gain, and a matrix. The state during which the camera setting value is being reflected is displayed on the viewfinder as a screen 61A as shown in FIG. 11, for example.

A time required for an operation in which settings of two imaging apparatuses for capturing a stereoscopic video are matched with each other can be shortened significantly, with the result that time and effort for shooting preparation can be saved.

It should be noted that in this example, the camera operator presses the assignable button to transmit the camera setting value from the main apparatus to the sub-apparatus. However, a dedicated button may be provided, or an item for transmitting setting data of the imaging apparatus 1 is selected from a menu so that the transmission function described above may be executed. Alternatively, after the genlock signals and the time code signals are synchronized in the two imaging apparatuses 1 and 2, a structure in which a camera setting value is automatically transmitted from the main apparatus to the sub-apparatus to share the camera setting value therebetween may be adopted.

In this example, the processing of reflecting the camera setting value of the main imaging apparatus 1 on the sub-imaging apparatus 2 is assumed only when the camera operator executes an operation of transmitting the setting data as described above. In other words, after the camera setting value of the main imaging apparatus 1 is reflected on the sub-imaging apparatus 2, the camera setting values of the main imaging apparatus and the sub-imaging apparatus are not constantly in conjunction (synchronization) with each other, and setting values of the shooting parameters can be changed for each imaging apparatus. This is because an individual difference is slightly caused in the imaging apparatuses due to, for example, a color of lens glass of an optical system and items whose setting values are desired to be slightly changed appear between the two imaging apparatuses. In this way, it is possible not only to set the same camera setting values for the two imaging apparatuses, but also to give offset thereto, and shooting suitable for the two imaging apparatuses actually used can be performed.

[Example of Recording Start and Reproduction Stop]

When the camera operator presses a recording button of the main imaging apparatus 1 or a recording button of a remote controller to instruct the imaging apparatus 1 to perform recording, the main controller 37 of the imaging apparatus 1 transmits a recording command to the sub-imaging apparatus 2. Since the imaging apparatus 1 and the imaging apparatus 2 have already been synchronized with each other, when the imaging apparatus 1 transmits recording start frame information to the imaging apparatus 2, the imaging apparatus 1 and the imaging apparatus 2 can start recording (shooting) at the same time. Similarly, when the camera operator presses a stop button of the operation unit 38 of the main imaging apparatus 1 or a stop button of the remote controller, the imaging apparatus 1 and the imaging apparatus 2 can stop recording at the same time. Further, in the case where a free space of a recording medium (for example, memory card 43) of the imaging apparatus 1 or the imaging apparatus 2 is not left or the case where a recording medium is out of order, the imaging apparatus 1 and the imaging apparatus 2 can stop recording at the same time.

As described above, according to the present disclosure, the recording start and recording stop of two imaging apparatuses can be reliably executed by one operation.

In the embodiment described above, the imaging apparatus 1 is set to be a main apparatus and the imaging apparatus 2 is set to be a sub-apparatus, but they may be reversely set as a matter of course.

Further, in the embodiment described above, the structure in which the coaxial wires are used for transmitting a genlock signal and a time code signal is adopted (see FIGS. 3 to 5), but it may be the same structure as that of the conductive wires for transmitting a data signal.

It should be noted that the present disclosure may be structured as follows.

(Deletion)

It should be noted that a series of processing in the embodiment described above can be executed by hardware, but it may also be executed by software. In the case where a series of processing is executed by software, the series of processing can be executed by a computer in which a program constituting the software is incorporated in dedicate hardware (or control apparatus such as CPU) or a computer in which programs for executing various functions are installed. For example, a program constituting desired software may be installed in a general-purpose personal computer or the like for execution.

Further, a recording medium on which a program code of the software that achieves the function of the embodiment described above is recorded may be supplied to a system or an apparatus. Furthermore, it is needless to say that the function is also achieved when a computer of the system or apparatus reads out the program code stored in the recording medium and executes it.

As the recording media for supplying a program code in this case, for example, a flexible disc, a hard disk, an optical disc, an magneto-optical disc, a CD-ROM, a CD-R, a magnetic tape, a nonvolatile memory card, and a ROM can be used.

Further, by execution of the program code read out by the computer, the function of the embodiment described above is achieved. In addition, based on an instruction of the program code, an OS or the like that is operating on the computer performs part of or all of actual processing. The case where the function of the embodiment described above is achieved by the processing is also included.

Further, in this specification, processing steps describing time-series processing also include, in addition to processing that are performed in time series along the described order, processing that are executed in parallel or individually though not processed chronologically (for example, parallel processing or processing by object).

As describe above, the present disclosure is not limited to the embodiment described above and can take various modified examples and application examples without departing from the gist described in the Claims.

The present application contains subject matter related to that disclosed in Japanese Priority Patent Application JP 2011-125188 filed in the Japan Patent Office on Jun. 3, 2011, the entire content of which is hereby incorporated by reference.

Additionally, the present technology may also be configured as below.

(1)
A stereoscopic video imaging system, comprising:
a first imaging apparatus;
a second imaging apparatus coupled to the first imaging apparatus and arranged to take a 3D image;
a single cable to connect the first imaging apparatus to the second imaging apparatus;
a switching device for selecting one of the first and second imaging apparatuses to be a main imaging apparatus and the remaining imaging apparatus to be a sub imaging apparatus,
wherein the main imaging apparatus is enabled to generate a synchronization signal, the synchronization signal being communicated to the sub imaging apparatus through the single cable.

(2)
The stereoscopic video imaging system according to (1), wherein the main imaging apparatus is enabled to generate a time code signal for matching a time code for the main imaging apparatus with a time code of the sub imaging apparatus, the time code signal being communicated to the sub imaging apparatus through the single cable.

(3)
The stereoscopic video imaging system according to any of (1) or (2), wherein the main imaging apparatus is enabled to generate a data signal containing a shooting parameter, the data signal being communicated to the sub imaging apparatus through the single cable.

(4)
The stereoscopic video imaging system according to claim according to any of (1) to (3), wherein the single cable includes a first conductive wire for transmitting the synchronization signal and a second conductive wire for transmitting the time code signal, and each of the first imaging apparatus and the second imaging apparatus includes
a circuit provided in the imaging apparatus,
a first input circuit that is connected to the circuit of the imaging apparatus and receives an input of a synchronization signal of the second imaging apparatus via the single cable,
a first output circuit that is connected to the circuit of the first imaging apparatus and outputs a synchronization signal of the imaging apparatus via the single cable,
a second input circuit that is connected to the circuit of the first imaging apparatus and receives an input of a time code signal of the second imaging apparatus via the single cable,
a second output circuit that is connected to the circuit of the first imaging apparatus and outputs a time code signal of the first imaging apparatus via the single cable,
a first switching unit that is connected to the first conductive wire and switches between the first input circuit and the first output circuit in accordance with a setting of the first imaging apparatus,
a second switching unit that is connected to the second conductive wire and switches between the second input circuit and the second output circuit in accordance with the setting of the first imaging apparatus, and
a controller that sets, based on an operation input signal, the imaging apparatus to be one of a main apparatus and a sub imaging apparatus and instructs the first switching unit and the second switching unit to perform switching in accordance with the setting.

(5)
The stereoscopic video imaging system according to (4), wherein
the controller instructs, when the first imaging apparatus is set to be the main apparatus, the first switching unit and the second switching unit to switch to the first output circuit and the second output circuit and instructs, when the first imaging apparatus is set to be the sub-apparatus, the first switching unit and the second switching unit to switch to the first input circuit and the second input circuit.

(6)
The stereoscopic video imaging system according to any of (4) or (5), wherein
the controller transmits, after the switching by the first switching unit and the second switching unit is completed, the synchronization signal to the second imaging apparatus via the first conductive wire of the single cable and transmits the time code signal to the second imaging apparatus via the second conductive wire of the single cable.

(7)
The stereoscopic video imaging system according to any of (1) to (4), comprising a controller configured to provide a first switching signal to the second imaging apparatus when the first imaging apparatus is selected to be the main apparatus, the first switching signal indicating the second imaging apparatus is to be switched to a sub imaging apparatus.

(8)
 The stereoscopic video imaging system according to (7), wherein the controller is configured to receive a second switching signal from the second imaging apparatus, the second switching signal causing the switching device to switch the first imaging apparatus to be a sub imaging apparatus.

(9)
 The stereoscopic video imaging system according to (4), wherein
 the first conductive wire and the second conductive wire of the cable are center cores of a coaxial wire.

(10)
 An imaging device, comprising:
 a single cable;
 a receiver to receive signals from a main imaging apparatus through the single cable;
 a transmitter to transmit signals to a sub imaging apparatus through the single cable; and
 a switching device to switch the imaging device to either a main imaging apparatus mode or a sub imaging apparatus mode,
 wherein the imaging device is enabled to generate a 3D image in communication with a second imaging apparatus,
 wherein when in the main imaging apparatus mode the imaging device is enabled to generate a synchronization code, the synchronization signal being communicated to the second imaging apparatus through the single cable,
 wherein when in the sub imaging apparatus mode the imaging device is enabled to receive a synchronization code, the synchronization signal being communicated from the second imaging apparatus through the single cable.

(11)
 The imaging device according to (10), wherein when in the main imaging apparatus mode the imaging device is enabled to generate a time code signal for matching a time code for the imaging apparatus with a time code of the sub imaging apparatus, the time code signal being communicated to the second imaging apparatus through the single cable,
 wherein when in the sub imaging apparatus mode the imaging device is enabled to receive a time code signal, the time code signal being communicated from the second imaging apparatus through the single cable.

(12)
 The imaging device according to any of (10) or (11), wherein when in the main imaging apparatus mode the imaging device is enabled to generate a data signal containing a shooting parameter, the data signal being communicated to the second imaging apparatus through the single cable,
 wherein when in the sub imaging apparatus mode the imaging device is enabled to receive a data signal, the data signal being communicated from the second imaging apparatus through the single cable.

(13)
 A stereoscopic video imaging method, comprising:
 generating a first image in a first imaging apparatus;
 generating a second image in a second imaging apparatus coupled to the first imaging apparatus and arranged to take a 3D image;
 connecting the first imaging apparatus to the second imaging apparatus by a single cable;
 selecting one of the first and second imaging apparatuses to be a main imaging apparatus and the remaining imaging apparatus to be a sub imaging apparatus,
 wherein, when first imaging apparatus is selected to be the main imaging apparatus, the first imaging apparatus is enabled to generate a synchronization signal, the synchronization signal being communicated to the sub imaging apparatus through the single cable.

(14)
 An imaging method, comprising:
 coupling between a main imaging apparatus and sub imaging apparatus through a single cable;
 receiving signals from the main imaging apparatus through the single cable when in the sub imaging apparatus mode;
 transmitting signals to the sub imaging apparatus through the single cable when in the main imaging apparatus mode; and
 switching to either the main imaging apparatus mode or the sub imaging apparatus mode,
 wherein the main imaging apparatus and the sub imaging apparatus are enabled to generate a 3D image,
 wherein when in the main imaging apparatus mode, generating a synchronization code, the synchronization signal being communicated to an imaging apparatus in the sub imaging apparatus mode through the single cable,
 wherein when in the sub imaging apparatus mode, receiving a synchronization code, the synchronization signal being communicated from an imaging apparatus in the main imaging apparatus mode through the single cable.

REFERENCE SIGNS LIST 1, 2 imaging apparatus
3 dedicated cable
7 assignable button
8 recording button
10 stereoscopic video imaging system
11A, 11B connector (male)
12, 13 coaxial wire
14 to 17 conductive wire
21 connector (female)
22 input and output I/F
23 input circuit
24 output circuit
25 switching unit
31 imaging unit
32 signal processing unit
33 memory
34 recording/reproducing processing unit
35 display controller
36 display panel (viewfinder)
37 main controller
38 operation unit
39 imaging controller
40 memory
41 communication controller
51 command analysis unit
52 dedicated cable detection unit
53 negotiation unit
54 input/output switching controller
55 synchronization controller

What is claimed is:

1. A video imaging system, comprising:
   a first imaging apparatus;
   a second imaging apparatus coupled to the first imaging apparatus;
   a single cable configured to couple the first imaging apparatus with the second imaging apparatus, the single cable including a time code conductive wire for carrying a time code signal, a sync signal conductive wire for carrying a synchronization signal, and data conductive wires, each for carrying a data signal;
   each of the first and second imaging apparatuses including a connector having time code, sync signal, data transmit and data receive terminals connected to respective ones of the time code, sync signal and data conductive wires of the single cable;
   each of the first and second imaging apparatuses including a time code output circuit for outputting a time code to the time code terminal and a time code input circuit for inputting a time code from the time code terminal, a sync signal output circuit for outputting a synchronization signal to the sync signal terminal and a sync signal input circuit for inputting a synchronization signal from the sync signal terminal; the connector configured to connect the conductive wires of the single cable to respective ones of the time code, sync signal, data transmit and data receive terminals of a respective imaging apparatus, wherein the data transmit terminal of a respective imaging apparatus is coupled to the data receive terminal of the other imaging apparatus;
   controller circuitry to set the first imaging apparatus to be one of a main imaging apparatus and a sub imaging apparatus via a control signal; and
   a terminal switching circuit in each of the imaging apparatuses configured to connect the time code output circuit to the time code terminal of the respective imaging apparatus and to connect the sync signal output circuit to the sync signal terminal of that imaging apparatus when that respective imaging apparatus is set to be the main imaging apparatus, and to connect the time code input circuit to the time code terminal of the respective imaging apparatus and to connect the sync signal input circuit to the sync signal terminal of that imaging apparatus when that respective imaging apparatus is set to be the sub imaging apparatus,
   wherein the controller circuitry of the first or second imaging apparatus, set to be the main imaging apparatus, is configured to transmit to the other of the first or second imaging apparatus, set to be the sub imaging apparatus, a switching command to cause the terminal switching circuit of the sub imaging apparatus to connect the time code input circuit and the sync signal input circuit of the sub imaging apparatus to the time code and sync signal terminals of the sub imaging apparatus, respectively,
   wherein the controller circuitry of the other of the first or second imaging apparatus, set to be the sub main imaging apparatus, is configured to transmit to the first or second imaging apparatus, set to be the main imaging apparatus, in response to the switching command, a completion command indicating that the time code input circuit and the sync signal input circuit of the sub imaging apparatus are connected to the time code and sync signal terminals of the sub imaging apparatus, respectively;
   wherein, prior to transmitting the switching command, the controller circuitry of the first or second imaging apparatus, set to be the main imaging apparatus, transmits a request for setting information to the first or second imaging apparatus, set to be the sub imaging apparatus, and the first or second imaging apparatus, set to be the sub imaging apparatus, receives the request and transmits the setting information to the first or second imaging apparatus, set to be the main imaging apparatus; and
   wherein, subsequent to receiving the setting information and prior to transmitting the switching command, the terminal switching circuit of the first or second imaging apparatus, set to be the main imaging apparatus, connects the time code output circuit to the time code terminal and connects the sync signal output circuit to the sync signal terminal of that imaging apparatus, set to be the main imaging apparatus.

2. The video imaging system of claim 1, wherein
   the data signal carried by at least one of the data conductive wires of the single cable contains at least an imaging apparatus setting parameter that is transmitted from the imaging apparatus set to be the main imaging apparatus to the other imaging apparatus.

3. The video imaging system according to claim 1, wherein
   the controller circuitry is configured to output, after the connections by the terminal switching circuits are completed and the completion command is transmitted, the synchronization signal to the imaging apparatus set to the sub imaging apparatus via the sync signal conductive wire of the single cable and output the time code signal to the imaging apparatus set to the sub imaging apparatus via the time code conductive wire of the single cable.

4. The video imaging system according to claim 1, wherein
   the sync signal conductive wire and the time code conductive wire of the cable are center cores of a coaxial wire.

5. An imaging device, comprising:
   a receiver to receive signals from a first imaging apparatus through a single cable;
   a transmitter to transmit signals to the first imaging apparatus through the single cable; and
   controller circuitry configured to set the imaging device to either a main imaging apparatus mode or a sub imaging apparatus mode via a control signal,
   wherein when in the main imaging apparatus mode, the imaging device is configured to generate a synchronization signal, the synchronization signal being transmitted with a time code signal for matching each time code of the imaging device and the first imaging apparatus, and the synchronization signal being transmitted to the first imaging apparatus through the single cable,
   the single cable including a time code conductive wire for carrying a time code signal, a sync signal conductive wire for carrying a synchronization signal, and data conductive wires, each for carrying a data signal;
   the imaging device including a connector having time code, sync signal, data transmit and data receive terminals connected to respective ones of the time code, sync signal and data conductive wires of the single cable;
   the imaging device including a time code output circuit for outputting a time code to the time code terminal and a time code input circuit for inputting a time code from the time code terminal, a sync signal output circuit for outputting a synchronization signal to the sync signal terminal and a sync signal input circuit for inputting a synchronization signal from the sync signal terminal;

a cable connector configured to connect the conductive wires of the single cable to respective ones of the time code, sync signal, data transmit and data receive terminals of the imaging device; and a terminal switching circuit configured to connect the time code output circuit to the time code terminal of the imaging device and to connect the sync signal output circuit to the sync signal terminal of the imaging device when that imaging device is set to the main imaging apparatus mode, and to connect the time code input circuit to the time code terminal of the imaging device and to connect the sync signal input circuit to the sync signal terminal of that imaging device when that imaging apparatus is set to the sub imaging apparatus mode;

wherein when in the sub imaging apparatus mode, the imaging device is configured to receive the synchronization signal, the synchronization signal being transmitted with the time code signal for matching each time code of the imaging device and the first imaging apparatus, and the synchronization signal being transmitted from the first imaging apparatus through the single cable, wherein the controller circuitry of the imaging device, when the imaging device is set to the main imaging apparatus mode, is configured to transmit to the first imaging apparatus a switching command to cause the first imaging apparatus to connect a time code input circuit and a sync signal input circuit of the first imaging apparatus to the time code and sync signal wires of the single cable, respectively;

wherein the controller circuitry of the imaging device, when the imaging device is set to the sub imaging apparatus mode, is configured to transmit to the first imaging apparatus, in response to the switching command, a completion command indicating that the time code input circuit and the sync signal input circuit of the imaging device are connected to the time code and sync signal terminals of the imaging device, respectively;

wherein, prior to transmitting the switching command, the controller circuitry of the imaging device, when the imaging device is set to be the main imaging apparatus, transmits a request for setting information to the first imaging apparatus, set to be the sub imaging apparatus, and the imaging device, when the imaging device is set to be the sub imaging apparatus, receives a request for status information from the first imaging apparatus and transmits the setting information to the first imaging apparatus, set to be the main imaging apparatus; and wherein, subsequent to receiving the setting information and prior to transmitting the switching command, the terminal switching circuit of the imaging device, when the imaging device is set to be the main imaging apparatus, connects the time code output circuit to the time code terminal and connects the sync signal output circuit to the sync signal terminal of the imaging device.

6. The imaging device of claim 5, wherein when in the main imaging apparatus mode the imaging device is configured to generate a data signal containing at least an imaging device setting parameter, the data signal being communicated to the first imaging apparatus through at least one data conductive wire of the single cable, wherein when in the sub imaging apparatus mode the imaging device is configured to receive a data signal, the data signal being communicated from the first imaging apparatus through at least one data conductive wire of the single cable.

7. A video imaging method, comprising the steps of:

generating a first image in a first imaging apparatus;

generating a second image in a second imaging apparatus coupled to the first imaging apparatus;

coupling the first imaging apparatus to the second imaging apparatus by a single cable including a time code conductive wire for carrying a time code signal, a sync signal conductive wire for carrying a synchronization signal, and data conductive wires, each for carrying a data signal;

outputting a request for setting information through the single cable from the first imaging apparatus, when the first imaging apparatus is set to be the main imaging apparatus;

receiving the request and outputting the setting information through the single cable from the second imaging apparatus, when the second imaging apparatus is set to be the sub main imaging apparatus;

receiving the outputted setting information through the single cable at the first imaging apparatus;

subsequent to receiving the outputted setting information, connecting the time code output circuit and the sync signal output circuit of the first imaging apparatus to the single cable, when the first imaging apparatus is set to be the main imaging apparatus;

subsequent to receiving the outputted setting information, outputting a switching command to the single cable from the first imaging apparatus, when the first imaging apparatus is set to be the main imaging apparatus, the switching command causing the second imaging apparatus to connect a time code input circuit and a sync signal input circuit to the single cable;

outputting a completion command to the single cable from the second imaging apparatus, in response to the switching command, indicating that the time code input circuit and the sync signal input circuit of the second imaging apparatus are connected to the single cable;

selectively outputting and inputting a time code;

selectively outputting and inputting a synchronization signal;

setting the first imaging apparatus to be one of a main imaging apparatus and a sub imaging apparatus via a control signal; and outputting a time code and outputting a synchronization signal to the single cable from the first imaging apparatus when the first imaging apparatus is set to be the main imaging apparatus, and inputting the time code and inputting the synchronization signal from the single cable to the first imaging apparatus when the first imaging apparatus is set to be the sub imaging apparatus.

8. An imaging method, comprising the steps of:

coupling a main imaging apparatus and sub imaging apparatus through a single cable including a time code conductive wire for carrying a time code signal, a sync signal conductive wire for carrying a synchronization signal, and data conductive wires, each for carrying a data signal;

receiving signals from the main imaging apparatus through the single cable when in the sub imaging apparatus mode;

transmitting signals to the sub imaging apparatus through the single cable when in the main imaging apparatus mode; and setting to either the main imaging apparatus mode or the sub imaging apparatus mode via a control signal, wherein when in the main imaging apparatus mode, generating a request for setting information, the request being communicated to an imaging apparatus in the sub imaging apparatus mode through the single cable;

wherein when in the sub imaging apparatus mode, and in response to the request, generating the setting information, the setting information being communicated to an imaging apparatus in the main imaging apparatus mode through the single cable;

wherein when in the main imaging mode and subsequent to the setting information being communicated, connecting a time output circuit and a sync signal output circuit to the single cable;

wherein subsequent to communicating the setting information, when in the main imaging apparatus mode, generating a switch command, the switch command being communicated to an imaging apparatus in the sub imaging apparatus mode through the single cable, wherein when in the sub imaging apparatus mode, in response to the switch command, connecting a time input circuit and a sync signal input circuit to the single cable and generating a completion command indicating the completion command being communicated to an imaging apparatus in the main imaging apparatus mode through the single cable, wherein when in the main imaging apparatus mode, generating a synchronization signal, the synchronization signal being communicated with a time code signal to an imaging apparatus in the sub imaging apparatus mode through the single cable, the time code signal for matching each time code of the imaging apparatus in the sub imaging apparatus mode and an imaging apparatus in the main imaging apparatus mode, wherein when in the sub imaging apparatus mode, receiving a synchronization signal and a time code signal for matching each time code of the imaging apparatus in the main imaging apparatus mode and the imaging apparatus in the sub imaging apparatus mode, the synchronization signal and time code signal being communicated from the imaging apparatus in the main imaging apparatus mode through the sync signal and time code conductive wires of the single cable.

* * * * *